United States Patent
Hamo

(10) Patent No.: US 10,528,410 B2
(45) Date of Patent: Jan. 7, 2020

(54) APPARATUS, METHOD AND SYSTEM TO EXCHANGE ERROR INFORMATION IN A UNIFIED PROTOCOL COMMUNICATION

(71) Applicant: Oshri Ben Hamo, Jerusalem (IL)

(72) Inventor: Oshri Ben Hamo, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/572,686

(22) Filed: Dec. 16, 2014

(65) Prior Publication Data

US 2016/0170824 A1    Jun. 16, 2016

(51) Int. Cl.
*H04L 1/16*     (2006.01)
*G06F 11/07*    (2006.01)

(52) U.S. Cl.
CPC ........ *G06F 11/0772* (2013.01); *G06F 11/073* (2013.01); *G06F 11/0751* (2013.01); *H04L 1/1671* (2013.01)

(58) Field of Classification Search
CPC .............. H05K 999/99; G06F 11/1044; G06F 11/0772; G06F 11/073; G06F 11/0751;
(Continued)

(56) References Cited

U.S. PATENT DOCUMENTS 7,979,776 B2 *   7/2011   Hwang .............. G11B 20/1833
                                                          714/758
8,291,295 B2 *   10/2012  Harari ................. G06F 11/1068
                                                         365/185.09

(Continued)

FOREIGN PATENT DOCUMENTS

EP   2007051   12/2008
EP   2026534   2/2009
(Continued)

OTHER PUBLICATIONS

First Office Action (+English Translation) for Korean Application No. 10-2015-0159285 dated Aug. 2, 2016, 15 pages.
(Continued)

*Primary Examiner* — Guy J Lamarre
*Assistant Examiner* — Enam Ahmed
(74) *Attorney, Agent, or Firm* — Womble Bond Dickinson (US) LLP

(57) ABSTRACT

Techniques and mechanisms to identify an error to a host that controls a memory component based on communications based on a Mobile Industry Processor Interface (MIPI) Unified Protocol specification. In an embodiment, the memory component detects an error based on a data frame sent to the memory component from the host. In response to detecting the error, the memory device sends to the host a negative acknowledgment control (NAC) message including a negative acknowledgment identifier and an error code identifying an error type of the detected error. The NAC message is based on a NAC frame structure defined by the MIPI Unified Protocol specification. In another embodiment, the host receives the NAC message and stores error information based on the error code of the NAC message. The stored error information is accessible for purposes such as performance evaluation of the host and debugging.

21 Claims, 8 Drawing Sheets

(58) Field of Classification Search
CPC ............... G06F 11/076; G06F 11/1008; G06F 11/1068; H04L 1/1671
USPC .......................................... 714/763; 713/763
See application file for complete search history.

(56) References Cited

U.S. PATENT DOCUMENTS

| | | | | |
|---|---|---|---|---|
| 8,429,493 | B2* | 4/2013 | Sokolov | G06F 11/1072 713/187 |
| 8,516,339 | B1* | 8/2013 | Lesea | G11C 29/42 714/755 |
| 8,560,927 | B1* | 10/2013 | Pagiamtzis | G06F 11/10 714/704 |
| 8,996,951 | B2* | 3/2015 | Hyde | G06F 11/0703 711/103 |
| 9,483,370 | B2* | 11/2016 | Reche | G06F 11/073 |
| 2008/0016429 | A1* | 1/2008 | Saneshige | G06F 11/1008 714/763 |
| 2009/0132889 | A1* | 5/2009 | Radke | G06F 11/1068 714/763 |
| 2010/0005366 | A1* | 1/2010 | Dell | G06F 11/073 714/758 |
| 2010/0064181 | A1* | 3/2010 | Moyer | G06F 11/1064 714/48 |
| 2010/0165931 | A1 | 7/2010 | Nimbalker et al. | |
| 2011/0041025 | A1* | 2/2011 | Van Den Hamer | H04L 1/004 714/749 |
| 2013/0176864 | A1 | 7/2013 | Zhi et al. | |
| 2013/0262892 | A1* | 10/2013 | Radulescu | H04L 7/042 713/320 |
| 2015/0149735 | A1* | 5/2015 | Nale | G06F 11/079 711/147 |

FOREIGN PATENT DOCUMENTS

| | | |
|---|---|---|
| EP | 2391042 A1 | 11/2011 |
| KR | 20130140018 | 12/2013 |
| TW | 201134157 | 10/2011 |
| WO | WO-2009090255 A2 | 7/2009 |

OTHER PUBLICATIONS

International Search Report and Written Opinion from 15193991.5 dated Apr. 26, 2016, 9 pgs.
European Search Report for European Appiication No. 15 193 991.5 dated Apr. 26, 2016, 9 pages.
Non-Final Office Action and Search Report for Taiwan Patent Application No. 104136211 dated Dec. 15, 2016, 8 pgs.
Second Office Action (+English Translation) for Korean Application No. 10-2015-0159285 dated Feb. 22, 2017, 15 pages.
Chinese Office Action Application No. 201510786199.X, dated Jun. 5, 2018, 9 pgs.
Desoli et al: "An outlook on the evolution of mobile terminals: from monolithic to modular multiradio, multiapplication platforms", IEEE Circuits and Systems Magazine, IEEE Service Center, New York, NY, US, vol. 6, No. 2, Jan. 1, 2006 (Jan. 1, 2006), pp. 17-29.
Office Action received for European Patent Application No. 15193991. 5, dated Feb. 22, 2018, 5 pages.
Office Action received for European Patent Application No. 15193991. 5, dated Aug. 8, 2018, 8 pages.

* cited by examiner

Data Frame Structure 500

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1  | Start-of-Data-Frame header |||||||||||||||| 
| 0  | Data Frame Payload |||||||||||||||| 
| 0  | ... |||||||||||||||| 
| 0  | ... |||||||||||||||| 
| 0  | Data Frame Payload |||||||||||||||| 
| 1  | End-of-Data-Frame trailer |||||||||||||||| 
| 0  | 16-bit CRC ||||||||||||||||

Control Frame Structure 510

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1  | Start-of-Control-Frame header |||||||||||||||| 
| 0  | Control Frame Payload |||||||||||||||| 
| 0  | 16-bit CRC ||||||||||||||||

NAC Message Structure 520

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1  | ESC_DL 550 |||||||| NAC 530 ||| Error Code 540 ||| Rq |
| 0  | CCITT CRC-16 560 ||||||||||||||||

FIG. 5

APPARATUS, METHOD AND SYSTEM TO EXCHANGE ERROR INFORMATION IN A UNIFIED PROTOCOL COMMUNICATION

BACKGROUND

1. Technical Field

The present invention relates to computer devices and, more particularly but not exclusively, to communication of error information at a mobile device.

2. Background Art

Mobile computing and communications platforms, such as smartphones and tablets, typically consist of a host agent and hardware components including one or more storage devices. Communications between the host and such hardware components are often based on the definition of an interface, including controller logic to implement the interface and an associated software stack to control the communication.

The Universal Protocol (UniPro$^{SM}$) class of such interfaces—e.g., based on any of various UniPro$^{SM}$ standards of the MIPI® Alliance—variously include a layered protocol stack providing a general purpose, error-handling, high speed solution for interconnecting a broad range of components, as well as supporting different types of traffic including control messages, bulk data transfer and packetized streaming. In existing UniPro$^{SM}$ communication techniques, data frames are exchanged between a host agent and a memory or other component controlled that mobile device. Error handling mechanisms according to UniPro$^{SM}$ standards support the communication of a negative acknowledgement (NAC) from a protocol stack of host controller logic to a memory or other component controlled that mobile device.

BRIEF DESCRIPTION OF THE DRAWINGS

The various embodiments of the present invention are illustrated by way of example, and not by way of limitation, in the figures of the accompanying drawings and in which:

FIG. 5 is a diagram showing various formats of frames exchanged by a memory device and a host according to an embodiment.

DETAILED DESCRIPTION

Figure 1:
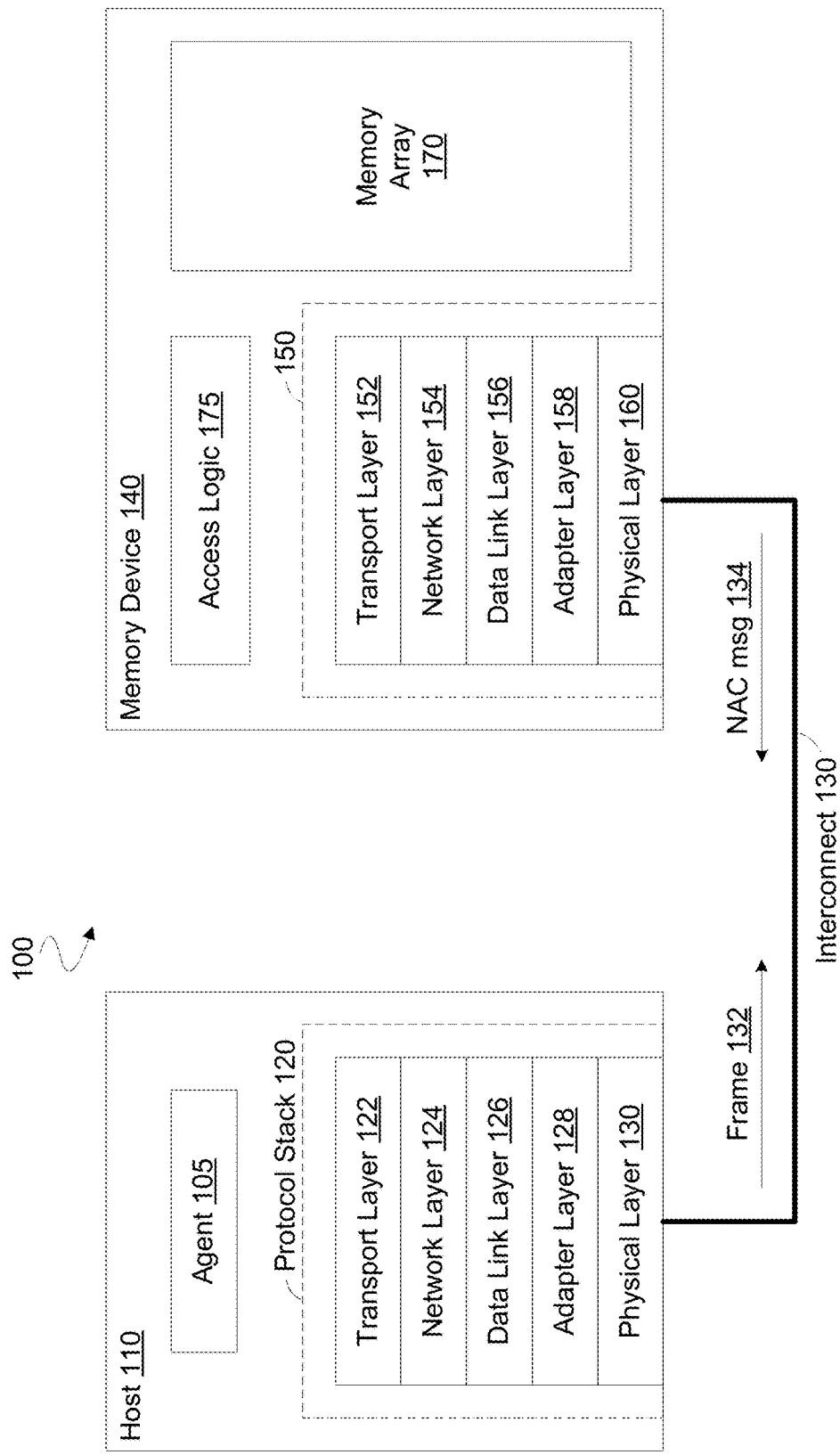
FIG. 1 is a high-level functional block diagram illustrating elements of a system for communicating error information according to an embodiment.

Embodiments discussed herein variously provide techniques and/or mechanisms for error information to be communicated from a memory component of a system to host logic of the system that controls the memory component. Such error information may be exchanged in communications that are based on any of various UniPro$^{SM}$ standards. Such standards include, for example, UniPro$^{SM}$ version 1.41.00, released Jul. 30, 2012 by the MIPI® Alliance and UniPro$^{SM}$ version 1.60.00, released Sep. 30, 2013 by the MIPI® Alliance.

For example, host logic of the platform may send to a memory component of the platform one or more data frames having a structure defined in the UniPro$^{SM}$ standard. In response to detecting an error associated with the exchanged one or more data frames, the memory component may send back to the host logic and identifier specifying an error type of the detected error. The error identifier may be sent to the host logic, for example, in a negative acknowledgment control (NAC) communication having a structure based on a NAC frame structure defined into UniPro$^{SM}$ standard.

The host logic may include or couple to one or more registers configured to store information identifying any of various errors associated with operation of the memory component by the host. An error identifier, received by the host from a memory component via a NAC communication, may be stored at such one or more registers and be subsequently made available—e.g., for debugging purposes. For example, inclusion of an error code in a NAC frame sent to the host may enable a debugger or other detection logic to determine how specifically the transmission of data frame to the memory component gave rise to a NAC communication. The communication of such NAC error information may allow the detection logic to further determine, for example, whether or not multiple errors have the same signature. In response, the detection logic may generate one or more signals to configure (e.g., reconfigure) host-side operations. Such configuration/reconfiguration may be distinguished, for example, from operations to recover from the detected error that is identified by the NAC message. The detection logic may further monitor for and evaluate such NAC error information to confirm whether a problem is still pending. For example, the detection logic may operate determine (e.g., along with a protocol analyzer device) whether the problem is on the memory components side, in the physical connection or at the host.

Currently, UniPro$^{SM}$ does not support the communication of an error code to identify to a host a specific error—e.g., one of multiple possible types of errors—that is a result of a data frame being transmitted to a component controlled by that host. UniPro$^{SM}$ specifications do not include error identifier fields in any such NAC frames to be sent to a host. Moreover, existing communication techniques based on these UniPro$^{SM}$ specifications do not contemplate the need for any such error information to be provided to a host. For example, error recovery by such a host is the same for various types of errors that may be indicated in a conventional NAC communication. Moreover, typical slave devices do not include error code registers that might be read according to UniPro$^{SM}$ standards—especially during a link loss condition—by a host that controls such slave devices.

However, some embodiments are the result of a realization that such information might be useful for host-side analysis and/or configuration to achieve performance gains other than the short-term problem solving provided by conventional error recovery. Detection logic included in or coupled to the host logic may operate in lieu of, or in addition to, a protocol analyzer to quickly identify any of various problems that might have resulted from transmission of a data packet from the host to a memory component.

FIG. 1 illustrates features of a system 100, according to one embodiment, including a memory device 140 and a host 110 coupled memory device 140 via an interconnect 130. Host 110 may comprise controller logic—including hardware, firmware and/or executing software—for a processor or other host agent of host 110 to access memory device 140. Such a host processor may include circuitry configured to execute a general-purpose operating system and/or other software for a computer platform that includes system 100. In one embodiment, memory device 140 includes one or more integrated circuit (IC) die other than any IC die of host 110. For example, memory device 140 may include a packaged device that is coupled to a packaged device of host 110 via a printed circuit board (not shown) of system 100. In another embodiment, system 100 is a packaged device that, for example, includes a system-on-chip (SoC). By way of illustration and not limitation, such a SoC may include host 110, wherein interconnect 130 couples memory device 142 the SoC.

Memory device 140 may include any of a variety of types of memory technology that have rows of memory cells, where data is accessible via a wordline or the equivalent. For example, memory device 140 may include memory array 170, which represents one or more logical and/or physical groups of memory. An example of one such grouping of memory is a bank of memory resources that, for example, may include storage elements arranged in rows and columns. Memory device 140 may include access logic 175 to facilitate, at least in part, access to memory array 170—e.g. where such access is provided for servicing one or more access requests from host 110. Such access logic 175 may include or couple to a protocol stack 150 of memory device that supports communications with host 110 via interconnect 130.

Memory device 140 may include any of a variety of mechanisms to support operations that are based on a UniPro$^{SM}$ standard. By way of illustration and not limitation, memory device 140 may include a Universal Flash Storage (UFS) that is based on a UFS standard such as the UFS 2.0 standard JESD220B, published September 2013 by the Joint Electron Device Engineering Council (JEDEC) Solid State Technology Association or the UFS 1.1 standard JESD220A published June 2011 by the JEDEC Solid State Technology Association. Such a UFS storage device may support one or more independent logical units to control access to a configurable mapped memory area (e.g., memory array 170). Alternatively or in addition, memory device 140 may include a Camera Serial Interface (CSI) device that is based on a third generation MIPI® Alliance Specification CSI-3 version 1.0, released February 2013.

Communications between host 110 and memory device 140 may be based on a UniPro$^{SM}$ standard. By way of illustration and not limitation, a protocol stack 120 of host 110 and a protocol stack 150 of memory device 140 may include respective physical layers 130, 160 to communicate with one another via interconnect 130. Physical layers 130, 160 may variously include respective receiver circuitry, transmitter circuitry and control/configuration logic to regulate operation thereof. The respective physical layers 130, 160 may exchange communications that are based on (e.g., meet some or all communication requirements of) any of a variety of mobile PHY (M-PHY$^{SM}$) standards of the MIPI® Alliance, such as the MIPI® Alliance Specification for M-PHY$^{SM}$ Version 2.0 of Apr. 4, 2014, the MIPI® Alliance Specification for M-PHY$^{SM}$ Version 3.0.r6, released Jul. 26, 2013 or the like. In some embodiments, operation of physical layers 130, 160 is based on any of a variety of differential PHY (D-PHY) standards of the MIPI® Alliance, such as the MIPI® Alliance Specification for D-PHY Version 0.9 of October, 2007, the MIPI® Alliance Specification for D-PHY Version 1.00.00 of May 14, 2009, the MIPI® Alliance Specification for D-PHY Version 1.1, approved on Dec. 16, 2011 or the like.

Protocol stacks 120, 150 may further comprise respective functional layers that variously support operations defined by a UniPro$^{SM}$ standard. In the illustrated embodiment of system 100, protocol stack 120 further comprises an adapter layer 128 between physical layer 130 and a data link layer 126, wherein adapter later 138 may accommodate various PHY technologies including that of physical layer 130. Data link layer 126 may generate data frames and/or control frames to be communicated from host 110 via PHY layer 130 and/or process frames received from memory device 140 via PHY layer 130. Such frame processing and generating may include operations specified in a UniPro$^{SM}$ standard. The particulars of such conventional UniPro$^{SM}$ techniques are not detailed herein, and are not limiting on certain embodiments. In some embodiments, such conventional UniPro$^{SM}$ techniques are extended or otherwise modified to further support the communication of certain error identifier information from memory device 140 to host 110.

Protocol stack 120 many further comprise a network layer 124 for that, for example, is to generate data packets which, in turn, are to be converted into data frames by data link layer 126. Alternatively or in addition, network layer 124 may process data packets that are based on data frames processed by data link layer 126. In an embodiment, protocol stack 120 further comprises a transport layer 122 that, for example, may support logical data streams, congestion mitigation and/or other high-level network management mechanisms. Protocol stack 120 may support only a subset of the features defined in a given UniPro$^{SM}$ standard. Accordingly, state machine logic and/or other circuitry of some higher levels of protocol stack 120—e.g., above data link layer 126—may be limited to a subset of UniPro$^{SM}$ functionality.

In an illustrative scenario according to one embodiment, operation of protocol stack 120 includes communicating to memory device 140 one or more data frames, as represented by the illustrative frame 132. Such communication may be on behalf of a processor, hub, microcontroller, software routine and/or other agent (e.g., the illustrative agent 105) of host 110. Protocol stack 150 may receive frame 132 at physical layer 160 via interconnect 130 and perform processing to detect for any errors associated with such receiving of frame 132. Such processing may include operations specified in a UniPro$^{SM}$ standard.

For example, protocol stack 150 may further comprise adapter layer 158, data link layer 156, network layer 154 and transport layer 152, which—respectively—correspond functionally to adapter layer 128, data link layer 126, network layer 124 and transport layer 122. Protocol stack 150 may process packets from host 110 to provide access to memory array 170 via operation of access logic 175. In an embodiment, functionality of protocol stack 150 comprises an extension to conventional UniPro$^{SM}$ functionality, wherein the detection of an error associated with frame 132 results in the generation of a NAC message 134 that includes information specifying a particular error type of the detected error. For example, the NAC message 134 may include both a first component specifying that the NAC message 134 represents a negative acknowledgement, and a second component comprising an error code or other identifier of a particular type of error detected by protocol stack 150. Protocol stack 120 may include logic to detect for and identify such error identification information of NAC message 134. In turn, protocol stack 120 may store a representation of such error identification information in one or more registers (not shown) that are included in or coupled to protocol stack 120. The stored error information may be available for use—e.g., by agent 105—in debugging or other operations to evaluate performance of system 100.

Figure 2A:
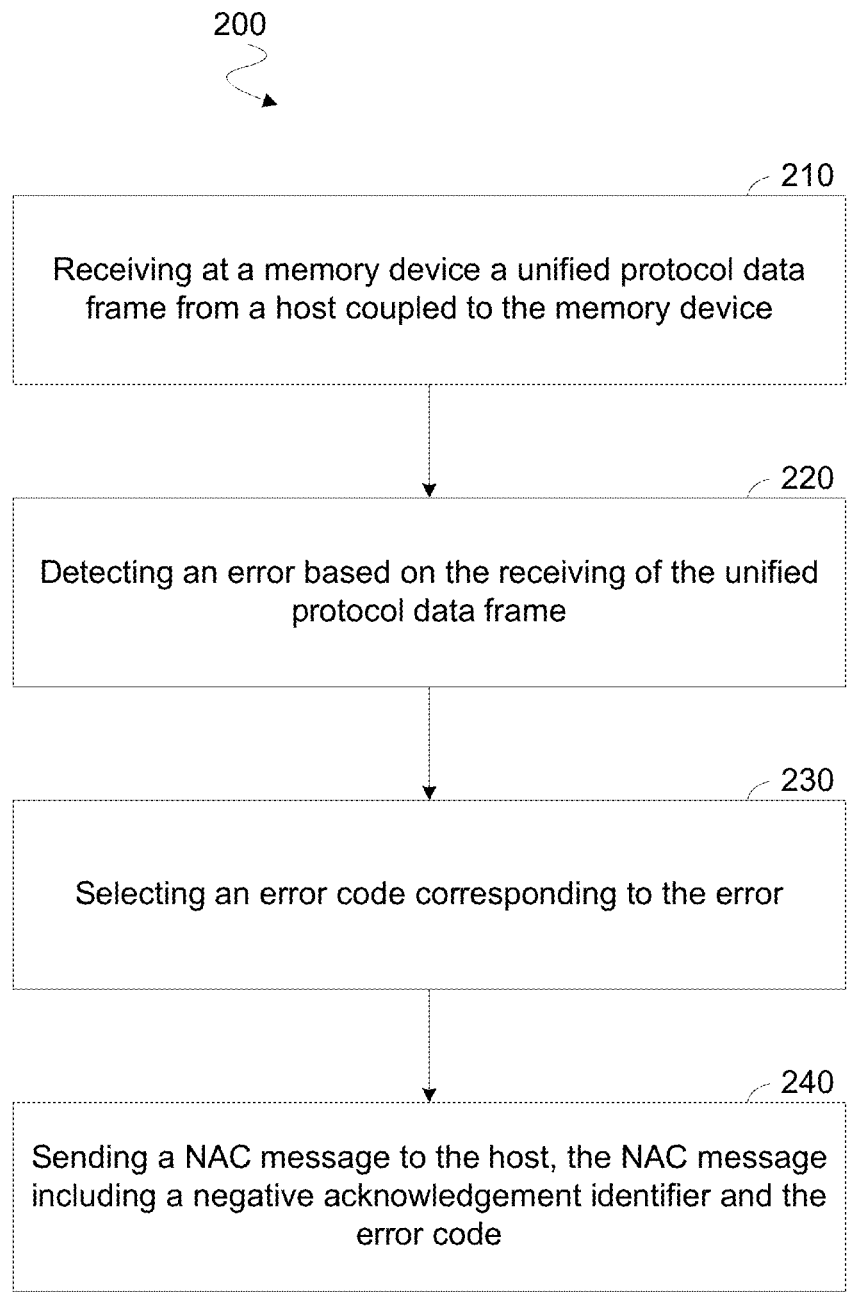
FIG. 2A is a flow diagram illustrating elements of a method for a memory device to provide error information in a unified protocol communication according to an embodiment.
Figure 3:
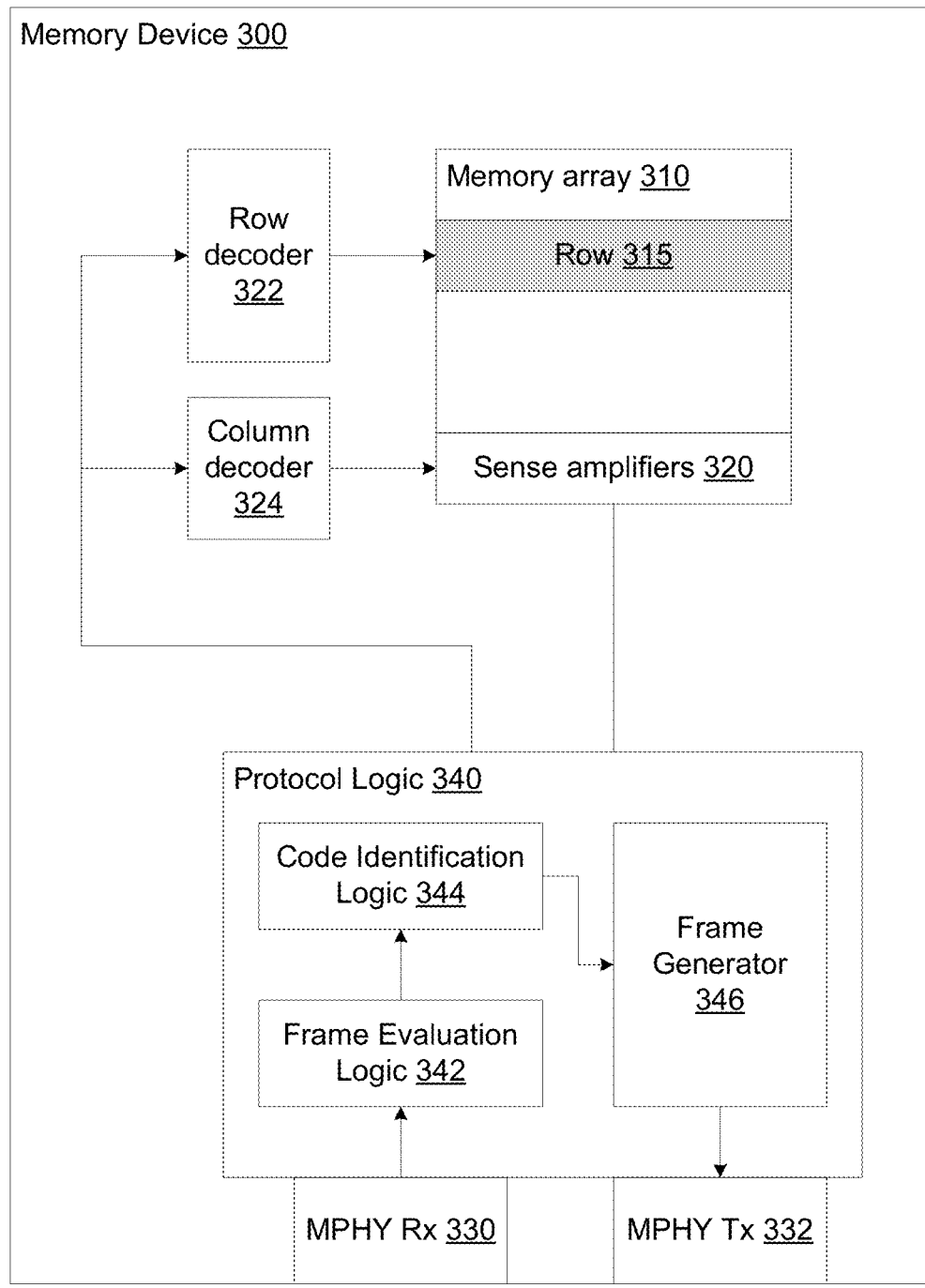
FIG. 3 is a high-level functional block diagram illustrating elements of a memory device to communicate error information according to an embodiment.

FIG. 2A illustrates features of a method 200 to provide error information with a memory device according to an embodiment. Method 200 may be performed, for example, to communicate NAC message 134 from memory device 140 to host 110. To illustrate certain features of various embodiments, method 200 is discussed herein with reference to memory device 300 of FIG. 3. However, such discussion may be extended to additionally or alternatively apply to any of the variety of other devices configured to execute or otherwise perform operations of method 200.

Memory device 300 may include some or all of the features of memory device 140. For example, a memory array 310 of memory device 300 may correspond functionally to memory array 170. Circuit logic of memory device 300—e.g., providing functionality of access logic 175—may include row decoder 322 to activate rows of memory array 310 based on row address information, column decoder 324 to activate columns of memory array 310 based on column address information and sense amplifiers to amplify signals exchanged with individual memory cells of memory array 310. Operation of such access logic may be adapted from conventional memory storage techniques and mechanisms, which are not detailed herein and are not limiting on certain embodiments.

Memory device 300 may exchange communications with a host (not shown) coupled thereto, wherein such communications facilitate access to one or more locations of memory array 310, as represented by the illustrative row 315. In an embodiment, memory device 300 includes circuitry to implement protocol stack logic—e.g., including some or all of protocol stack 150—to facilitate such communications, where operations of such circuitry are based on a UniPro$^{SM}$ standard. Such circuitry may include physical layer hardware, as represented by the illustrative receiver circuitry MPHY Rx 330 and transmitter circuitry MPHY Tx 332, that is based on a MIPI® M-PHY standard. Furthermore, protocol logic 340 (e.g., including hardware and/or firmware) of memory device 300 may be coupled to exchange signals with MPHY Rx 330 and MPHY Tx 332, where protocol stack logic 340 is to implement higher layers of the protocol stack.

In an embodiment, method 200 comprises, at 210, receiving at a memory device a unified protocol (e.g., UniPro$^{SM}$ compatible) data frame from the host coupled to the memory device. For example, memory device 300 may receive via MPHY Rx 330 one or more frames of data—e.g., including the illustrative frame 132 sent from host 110. Method 200 may further comprise, at 220, detecting an error based on the receiving of the unified protocol data frame at 210. For example, protocol logic 340 may include frame evaluation logic 342 comprising circuitry to detect for any of the plurality of errors that may be included in the data frame or otherwise associated with receipt of the data frame. Frame evaluation logic 342 may operate in a data link layer, for example.

The error detected at 220 may relate to a format of the data frame, content of the data frame, a state of hardware to receive or otherwise process the data frame, and/or the like. By way of illustration and not limitation, frame evaluation logic 342 may detect an error based on cyclic redundancy check (CRC) information included in the data frame, an overflow of a receive buffer, an incorrect size of a data frame payload, an incorrect sequence number of a data frame, an incorrect symbol within a data frame and/or any of various other such errors. The detecting at 220 may include error detection operations adapted from a UniPro$^{SM}$ standard, which are not detailed herein and are not limiting on certain embodiments. Examples of some errors that may be detected for by method 200 are listed in Table 1 herein.

Method 200 may further comprise, at 230, selecting an error code corresponding to the error detected at 220. For example, frame evaluation logic 342 may send to code identification logic 344 of protocol logic 340 a signal indicating detection of the error at 220. In response, circuitry of code identification logic 344 may determine a code corresponding to an error type for the detected error. In an embodiment, code identification logic 344 includes or otherwise has access to a table or other data structure defining multiple error code identifiers, where code identification logic 344 selects one such identifier at 230 for inclusion in a NAC message.

Method 200 may further comprise, at 240, sending a NAC message to the host, the NAC message including a negative acknowledgment identifier and the error code selected at 230. For example, protocol logic 340 may further comprise a frame generator 346 that is to generate a NAC message in response to detection of the error at 220. Generation of such a NAC message may include operations adapted from conventional UniPro$^{SM}$ techniques. Such operations may be extended to further communicate an identifier of an error type of an error that is a basis for the NAC message.

For example, frame generator 346 may receive from code identification logic 344 a value that is to serve as an error code for identifying the type of error detected at 220. Based on the value received from code identification logic 344, frame generator 346 may generate a NAC message that includes both a value that classifies the NAC message as a negative acknowledgment and an error identifier that specifies a particular type of error that is the cause of such negative acknowledgment. The NAC message may be sent from memory device 300 by frame generator 346 to a host (not shown) via MPHY Tx 332.

Figure 2B:
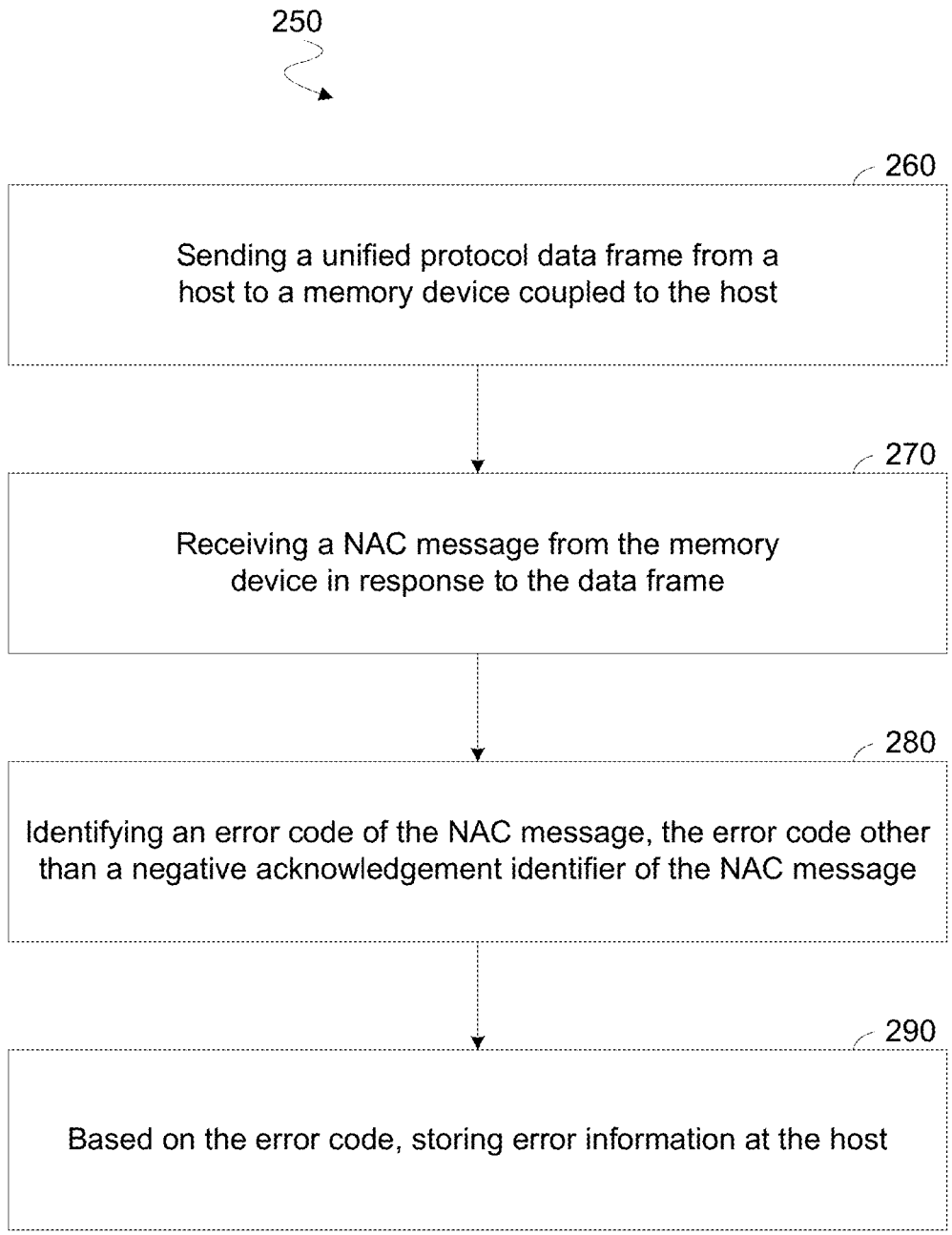
FIG. 2B is a flow diagram illustrating elements of a method for a host to receive error information in a unified protocol communication according to an embodiment.
Figure 4:
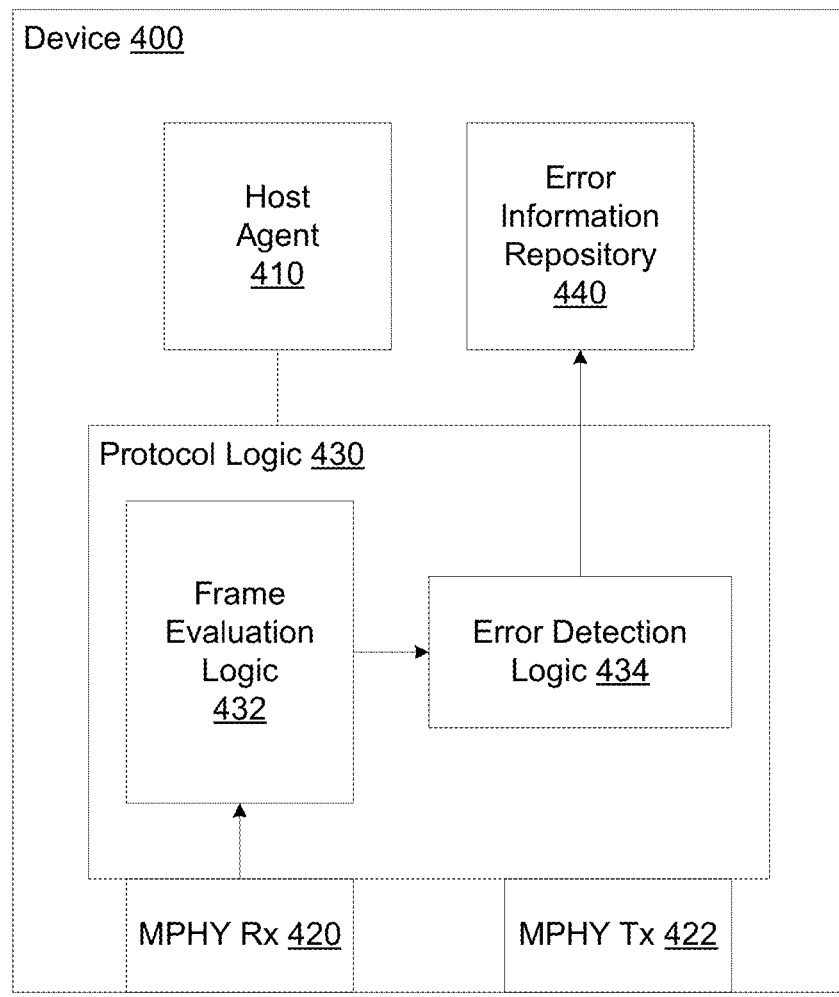
FIG. 4 is a high-level functional block diagram illustrating elements of a host to receive error information from a memory device according to an embodiment.

FIG. 2B illustrates features of a method 250 to identify an error based on a communication from a memory device according to an embodiment. Method 250 may be performed, for example, with logic such as that of host 110, where such logic facilitates control of a memory device coupled thereto. To illustrate certain features of various embodiments, method 250 is discussed herein with reference to device 400 of FIG. 4. However, such discussion may be extended to additionally or alternatively apply to any of the variety of other devices configured to execute or otherwise perform operations of method 250.

Device 400 may include some or all of the features of host 110, for example. In an embodiment, device 400 includes a host agent 410—e.g., providing functionality such as that of agent 105—to exchange communications with a memory device (such as one of memory devices 140, 300) coupled thereto, wherein such communications facilitate access to one or more memory locations of the memory device. Alternatively or in addition, host agent 410 may detect for and evaluate error information received from such a memory device.

In an embodiment, device 400 includes circuitry to implement a protocol stack to facilitate such memory access, where operations of the protocol stack are based on a UniPro$^{SM}$ standard. Such circuitry may include physical layer hardware, as represented by the illustrative receiver circuitry MPHY Rx 420 and transmitter circuitry MPHY Tx 422 that is based on a MIPI® M-PHY standard. Furthermore, protocol logic 430 (e.g., including hardware and/or firmware) of device 400 may be coupled to exchange signals with MPHY Rx 420 and MPHY Tx 422, where protocol stack logic 430 is to implement higher layers of the protocol stack.

Device 400 is one example of hardware that may perform method 250. In an embodiment, method 250 comprises, at 260, sending a unified protocol (e.g., UniPro$^{SM}$ compatible) data frame from a host to a memory device coupled to the host. For example, MPHY Tx 422 may transmit one or more frames of data such as the illustrative frame 132.

Method 250 may further comprise, at 270, receiving a NAC message from the memory device in response to the data frame sent at 260. For example, the memory device may generate such a NAC message—e.g., by performing method 200—in response to detecting an error associated with the data frame sent at 260. The NAC message may be received at device 400 via MPHY Rx 420. In an embodiment, method 250 further comprises, at 280, identifying an error code of the NAC message, wherein the error code is other than a negative acknowledgment identifier of the NAC message. For example, MPHY Rx 420 may perform PHY level processing to provide the NAC message to frame evaluation logic 432 of protocol logic 430. Frame evaluation logic 432 may perform data link layer processing of the NAC message that, for example, includes one or more NAC frame processing operations adapted from conventional UniPro$^{SM}$ techniques. Device 400 may supplement such as conventional UniPro$^{SM}$ techniques with additional operations to extract and store information specifying a particular type of error that is a cause of the NAC message being received at 270.

By way of illustration and not limitation, frame evaluation logic 432 may indicate to error detection logic 434 of protocol logic 430 that a negative acknowledgement identifier of the NAC message indicates the occurrence of some error. In response, error detection logic 434 may access from the NAC message an error code specifying an error type of an error that resulted in the NAC message being received at 270. Table 1 below includes an example of some errors that may be variously indicated by the value of such an error code:

Method 250 may further comprise, at 290, storing at the host error information based on the error code of the NAC message. For example, error detection logic 434 may store the error code to error information repository 440 of host 400. Error information repository 440 may include one or more error registers included in or coupled to the protocol stack of host 400—e.g., where such an error register is mapped to a hosts upper software stack.

FIG. 5 illustrates the structure of various frames that may be evaluated, exchanged of otherwise processed by a memory device and/or a host according to an embodiment. Some or all such frame structures may each be based on a respective frame structure specified in a UniPro$^{SM}$ standard. For example, data frame structure 500 may include both a two-byte (one-word) header portion to indicate a beginning of a data frame, and another one-word footer portion to indicate that a succeeding 16-bit CRC value is to be the last word of the data frame. In between the header portion and the footer portion are one or more payload words. The header portion and footer portions are each preceded by a respective single "1" bit indicator, wherein the other words of the data frame may each be preceded by a respective single "0" bit indicator.

A control frame structure 510 may include a one-word header portion, a one-word payload portion and a 16-bit CRC value. The header portion of the control frame structure 520 is preceded by a single "1" bit indicator, wherein the other words of the control frame are each preceded by a respective single "0" bit indicator. The data frame structure 500 and/or the control frame structure 510 may be a basis for detecting an error associated with the receipt of a frame by a memory device such as one of memory devices 140, 300. Alternatively or in addition, the content of a frame having one of data frame structure 500 and control frame structure 510 may be a basis for such error detection.

NAC message structure 520 includes a one-word portion to indicate that it is for the purpose of communicating a negative acknowledgement. By way of illustration and not limitation, such a one-word portion may include an escape character ESC_DL 550 to denote that the frame includes control information. NAC message structure 520 further comprises a field NAC 530 to include a negative acknowledgement identifier—e.g., indicating negative acknowledgement based on one or more frame previously sent from a host to a memory component. In addition to NAC 530, NAC

TABLE 1

Data Frame Errors

| Name | Description |
| --- | --- |
| CRC_ERROR | A cyclic redundancy check error on a data frame or a control frame |
| RX_BUFFER_OVERFLOW | An overflow of a receive buffer |
| MAX_FRAME_LENGTH_EXCEEDED | A frame with a payload longer than a maximum frame length has been received |
| WRONG_SEQUENCE_NUMBER | A correct frame with a wrong frame sequence number has been received |
| AFC_FRAME_SYNTAX_ERROR | An acknowledgement and flow control frame syntax error |
| NAC_FRAME_SYNTAX_ERROR | A negative acknowledgement frame syntax error (a NAC symbol not followed by one data symbol) |
| EOF_SYNTAX_ERROR | An end-of-frame error (an EOF_EVEN or an EOF_ODD not followed by one data symbol) |
| FRAME_SYNTAX_ERROR | A frame syntax error |
| BAD_CTRL_SYMBOL_TYPE | A bad control symbol type |
| PA_ERROR_IND_RECEIVED | A PA_ERROR.ind (physical adapter error message) has been received | message structure 520 includes another field error code 540 to communicate an identifier of a particular type of error that is a cause of the NAC frame being generated. Error code 540 may store any of a variety of values each to represent a different respective error type. For example, error code 540 may store a value to represent any of the errors of Table 1 herein. Although certain embodiments are not limited in this regard, the one-word portion including error code 540 may further comprise a single-bit value Rq indicating, for example, whether a system reset is being requested to recover from the error. Alternatively or in addition, the NAC message structure 520 may further include a 16-bit CRC value, as represented by the illustrative CCIT CRC-16 560—e.g., to store a CRC value according to a standard of the Comite Consultatif International Téléphonique et Télégraphique (CCITT). The first word of NAC message structure 520 may be indicated by a preceding single "1" bit indicator, wherein the other word of NAC message structure 520 is preceded by a single "0" bit indicator.

Figure 6:
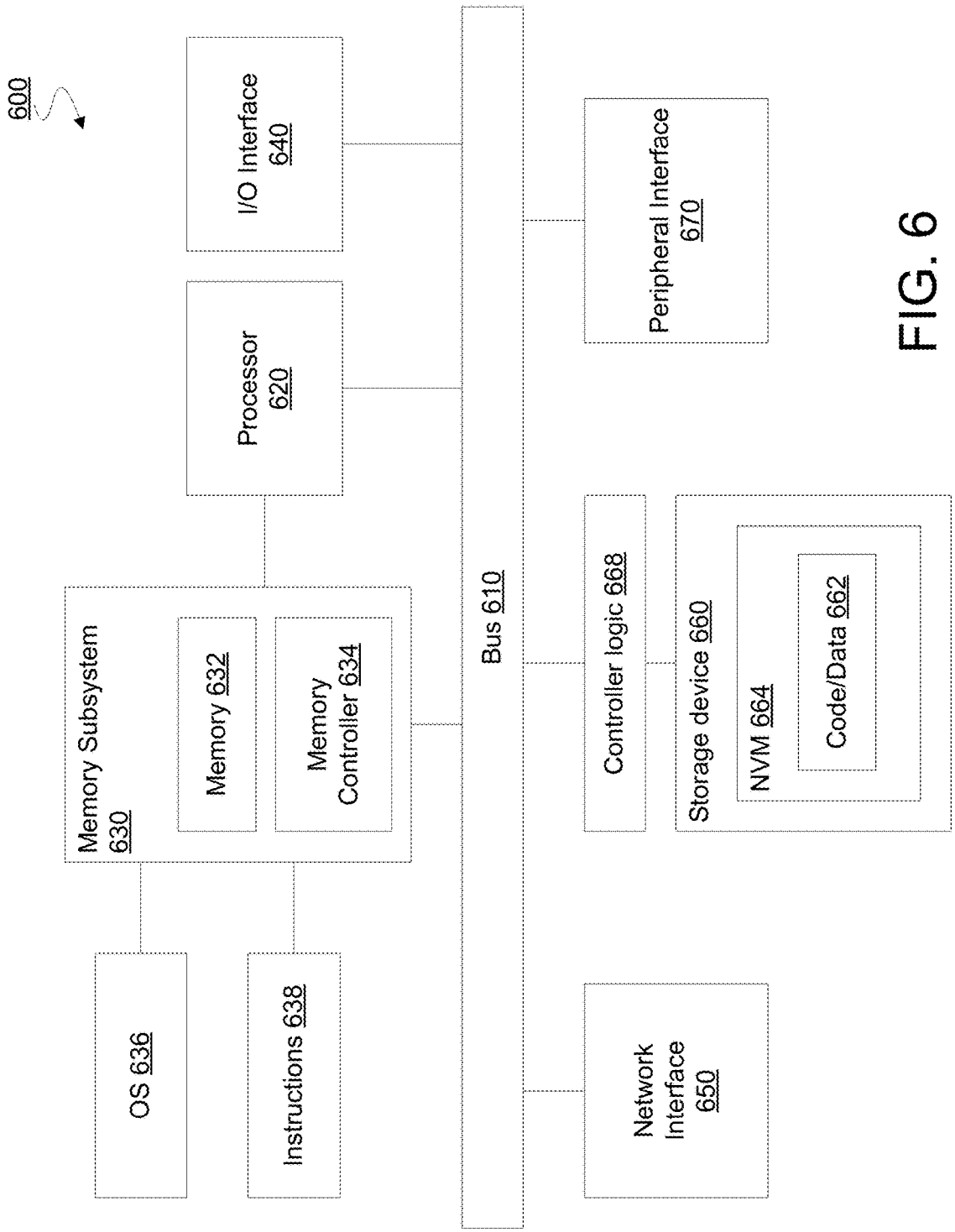
FIG. 6 is a block diagram illustrating elements of a computing system for exchanging error information according to an embodiment.

FIG. 6 is a block diagram of an embodiment of a computing system in which communication of error information may be implemented. System 600 represents a computing device in accordance with any embodiment described herein, and may be a laptop computer, a desktop computer, a server, a gaming or entertainment control system, a scanner, copier, printer, or other electronic device. System 600 may include processor 620, which provides processing, operation management, and execution of instructions for system 600. Processor 620 may include any type of microprocessor, central processing unit (CPU), processing core, or other processing hardware to provide processing for system 600. Processor 620 controls the overall operation of system 600, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 may include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620.

Storage device 660 may be or include any conventional nonvolatile medium (NVM) 664 for storing large amounts of data in a nonvolatile manner, such as one or more magnetic, solid state, or optical based disks, or a combination. NVM 664 may store code or instructions and data 662 in a persistent state (i.e., the value is retained despite interruption of power to system 600). Access to NVM 664 may be provided with controller logic 668 coupled to (or in some embodiments, included in) storage device 660. For example, controller logic 668 or may be any of the variety of host controller logic to exchange data frames to access NVM 664. In response to detecting an error associated with such data frames, storage device 660 may send to controller logic 668 a NAC frame including an identifier of a particular error type for the detected error. Storage device 660 may be generically considered to be a "memory," although memory 630 is the executing or operating memory to provide instructions to processor 620. Whereas storage 660 is nonvolatile, memory 630 may include volatile memory (i.e., the value or state of the data is indeterminate if power is interrupted to system 600).

Memory subsystem 630 may include memory device 632 where it stores data, instructions, programs, or other items. In one embodiment, memory subsystem 630 includes memory controller 634 to provide access to memory 632—e.g., on behalf of processor 620.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 may include, for example, one or more of a system bus, a Peripheral Component Interconnect (PCI) bus, an Open Core Protocol (OCP) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 may also correspond to interfaces in network interface 650.

System 600 may also include one or more input/output (I/O) interface(s) 640, network interface 650, one or more internal mass storage device(s) 660, and peripheral interface 670 coupled to bus 610. I/O interface 640 may include one or more interface components through which a user interacts with system 600 (e.g., video, audio, and/or alphanumeric interfacing). Network interface 650 provides system 600 the ability to communicate with remote devices (e.g., servers, other computing devices) over one or more networks. Network interface 650 may include an Ethernet adapter, wireless interconnection components, USB (universal serial bus), or other wired or wireless standards-based or proprietary interfaces.

Peripheral interface 670 may include any hardware interface not specifically mentioned above. Peripherals refer generally to devices that connect dependently to system 600. A dependent connection is one where system 600 provides the software and/or hardware platform on which operation executes, and with which a user interacts.

Figure 7:
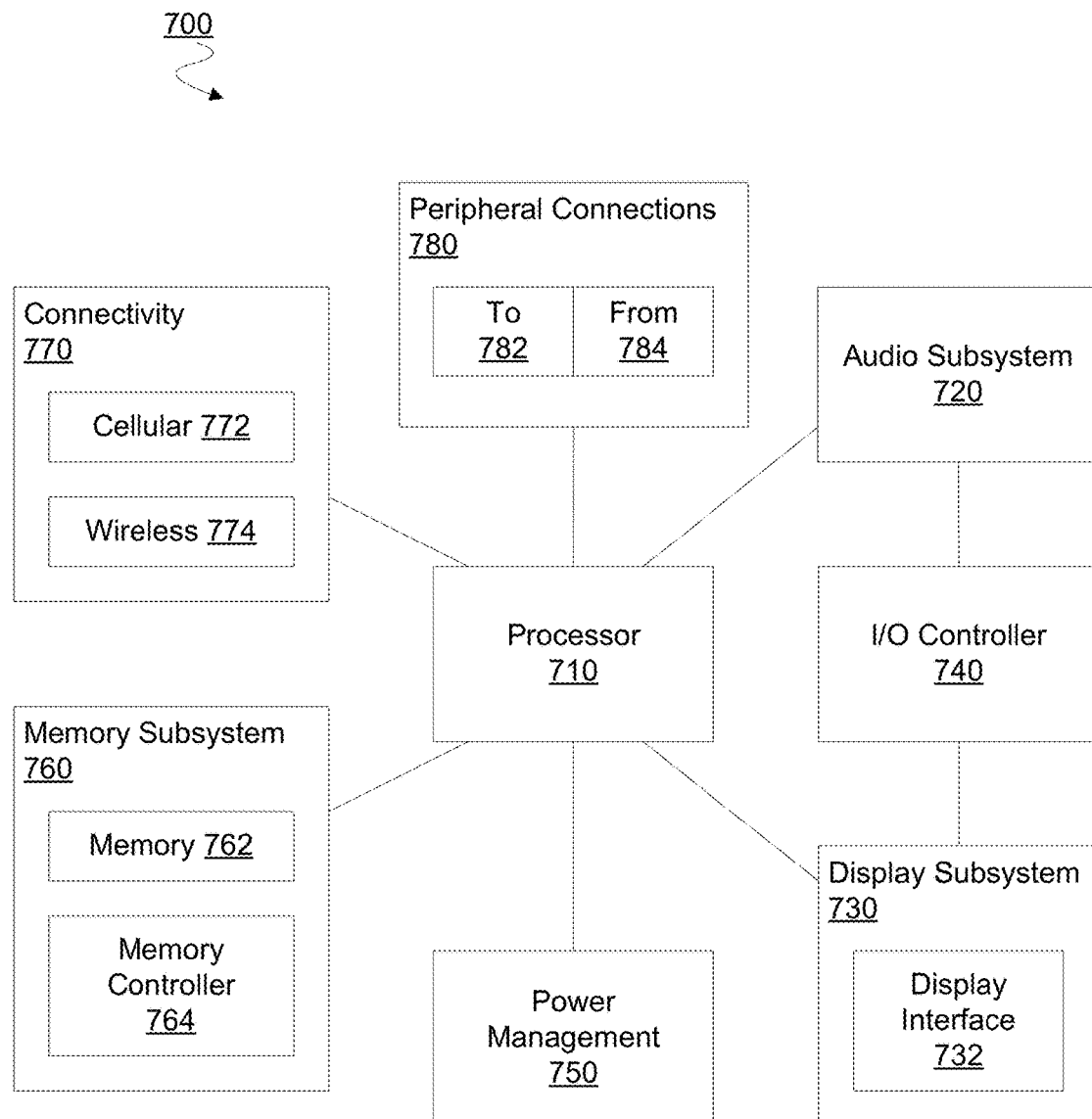
FIG. 7 is a block diagram illustrating elements of a mobile device for exchanging error information according to an embodiment.

FIG. 7 is a block diagram of an embodiment of a mobile device in which a communication of error information may be implemented. Device 700 represents a mobile computing device, such as a computing tablet, a mobile phone or smartphone, a wireless-enabled e-reader, or other mobile device. It will be understood that certain of the components are shown generally, and not all components of such a device are shown in device 700.

Device 700 may include processor 710, which performs the primary processing operations of device 700. Processor 710 may include one or more physical devices, such as microprocessors, application processors, microcontrollers, programmable logic devices, or other processing means. The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations may also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 may include display interface 732, which may include the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 may operate to manage hardware that is part of audio subsystem 720 and/or display subsystem 730. Additionally, I/O controller 740 illustrates a connection point for additional devices that connect to device 700 through which a user might interact with the system. For example, devices that may be attached to device 700 might include microphone devices, speaker or stereo systems, video systems or other display device, keyboard or keypad devices, or other I/O devices for use with specific applications such as card readers or other devices.

As mentioned above, I/O controller 740 may interact with audio subsystem 720 and/or display subsystem 730. For example, input through a microphone or other audio device may provide input or commands for one or more applications or functions of device 700. Additionally, audio output may be provided instead of or in addition to display output. In another example, if display subsystem includes a touchscreen, the display device also acts as an input device, which may be at least partially managed by I/O controller 740. There may also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that may be included in device 700. The input may be part of direct user interaction, as well as providing environmental input to the system to influence its operations (such as filtering for noise, adjusting displays for brightness detection, applying a flash for a camera, or other features).

In one embodiment, device 700 includes power management 750 that manages battery power usage, charging of the battery, and features related to power saving operation. Memory subsystem 760 may include memory device(s) 762 for storing information in device 700. Memory subsystem 760 may include nonvolatile (state does not change if power to the memory device is interrupted) and/or volatile (state is indeterminate if power to the memory device is interrupted) memory devices. Memory 760 may store application data, user data, music, photos, documents, or other data, as well as system data (whether long-term or temporary) related to the execution of the applications and functions of system 700.

In one embodiment, memory subsystem 760 includes memory controller 764 (which could also be considered part of the control of system 700, and could potentially be considered part of processor 710). Memory controller 764 may communicate signaling to control memory 762. In response to such signaling, memory 762 may send to memory controller 764 a NAC frame that includes an error identifier specifying an error resulting from communications received from memory controller 764.

Connectivity 770 may include hardware devices (e.g., wireless and/or wired connectors and communication hardware) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 may include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector may allow device 700 to connect to certain peripherals that allow device 700 to control content output, for example, to audiovisual or other systems.

In addition to a proprietary docking connector or other proprietary connection hardware, device 700 may make peripheral connections 780 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one implementation, a memory device comprises a protocol stack including circuitry configured to exchange communications with a host device coupled to the memory device, the host device to control the memory device, the communications based on a unified protocol specification. The protocol stack includes receiver circuitry configured to receive a data frame from the host device, frame evaluation logic configured to detect an error based on the data frame, code identification logic configured to select an error code corresponding to the error, a frame generator configured to generate a negative acknowledgment control (NAC) message including a negative acknowledgment identifier and the error code, wherein the NAC message is based on a NAC frame structure defined by the MIPI Unified Protocol specification, and transmitter circuitry configured to send the NAC message to the host.

In an embodiment, the unified protocol specification is a Mobile Industry Processor Interface (MIPI) Unified Protocol specification. In another embodiment, the memory device includes a flash storage device. In another embodiment, the flash storage device is based on a Joint Electron Device Engineering Council (JEDEC) Universal Flash Storage standard. In another embodiment, the memory device to couple to a system-on-chip device including the host device. In another embodiment, a physical layer of the protocol stack includes the receiver circuitry and the transmitter circuitry, and wherein the physical layer is based on a MIPI M-PHY specification.

In one implementation, method at a memory device comprises, with a protocol stack of the memory device, exchanging with a host device coupled to the memory device communications based on a unified protocol specification, including receiving a data frame from the host device. The method further comprises detecting an error based on the receiving of the data frame, and selecting an error code corresponding to the error, wherein the exchanging communications with the host device further comprises sending a negative acknowledgment control (NAC) message to the host, the NAC message including a negative acknowledgment identifier and the error code, wherein the NAC message is based on a NAC frame structure defined by the MIPI Unified Protocol specification.

In an embodiment, the unified protocol specification is a Mobile Industry Processor Interface (MIPI) Unified Protocol specification. In another embodiment, the memory device includes a flash storage device. In another embodiment, the flash storage device is based on a Joint Electron Device Engineering Council (JEDEC) Universal Flash Storage standard. In another embodiment, the memory device to couple to a system-on-chip device including the host device. In another embodiment, a physical layer of the protocol stack includes the receiver circuitry and the transmitter circuitry, and wherein the physical layer is based on a MIPI M-PHY specification.

In one implementation, a host device comprises a protocol stack including circuitry configured to exchange communications with a memory device coupled to the host device, wherein the host device to control the memory device, the communications based on a unified protocol specification. The protocol stack includes physical layer circuitry configured to send a data frame to the memory device, frame evaluation logic configured to receive a negative acknowledgment control (NAC) message from the memory device via the physical layer circuitry, the NAC message in response to the data frame, wherein the NAC message is based on a NAC frame structure defined by the MIPI Unified Protocol specification, the frame evaluation logic configured to detect a negative acknowledgement identifier of the NAC message, and error detection logic configured to identify an error code of the NAC message, the error code other than the negative acknowledgment identifier, the error detection logic further to store error information to a repository.

In an embodiment, the unified protocol specification is a Mobile Industry Processor Interface (MIPI) Unified Protocol specification. In another embodiment, the memory device includes a flash storage device. In another embodiment, the flash storage device is based on a Joint Electron Device Engineering Council (JEDEC) Universal Flash Storage standard. In another embodiment, the memory device to couple to a system-on-chip device including the host device. In another embodiment, a physical layer of the protocol stack includes the receiver circuitry and the transmitter circuitry, and wherein the physical layer is based on a MIPI M-PHY specification.

In one implementation, a method at a host device comprises, with a protocol stack of the host device, exchanging with a memory device coupled to the host device communications based on a unified protocol specification. The exchanging communications includes sending a data frame from the host device to a memory device coupled to the host device, receiving a negative acknowledgment control message from the memory device in response to the data frame, wherein the NAC message is based on a NAC frame structure defined by the MIPI Unified Protocol specification, identifying an error code of the negative acknowledgment control (NAC) message, the error code other than a negative acknowledgment identifier of the NAC message, and based on the error code, storing error information to a repository.

In an embodiment, the unified protocol specification is a Mobile Industry Processor Interface (MIPI) Unified Protocol specification. In another embodiment, the memory device includes a flash storage device. In another embodiment, the flash storage device is based on a Joint Electron Device Engineering Council (JEDEC) Universal Flash Storage standard. In another embodiment, the memory device to couple to a system-on-chip device including the host device. In another embodiment, a physical layer of the protocol stack includes the receiver circuitry and the transmitter circuitry, and wherein the physical layer is based on a MIPI M-PHY specification.

Techniques and architectures for identifying an error in data communications are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A memory device comprising:
   protocol logic including circuitry configured to exchange communications with a host device coupled to the memory device, the host device to control the memory device, the communications based on a unified protocol specification, the protocol logic including:
      receiver circuitry configured to receive a data frame from the host device;
      frame evaluation logic configured to detect an error related to a memory operation of the memory device in connection with received data frame;
      code identification logic configured to select an error code corresponding to the detected error of the memory operation, wherein the selected error code is included in a negative acknowledgement control (NAC) message having a NAC frame structure defined by the unified protocol specification for the host device;
      a frame generator configured to generate the NAC message including both the selected error code and a negative acknowledgment identifier in the NAC frame structure; and
      transmitter circuitry configured to send the NAC message from the memory device to the host.

2. The memory device of claim 1, wherein the unified protocol specification is a Mobile Industry Processor Interface (MIPI) Unified Protocol specification.

3. The memory device of claim 1, wherein the memory device includes a flash storage device.

4. The memory device of claim 3, wherein the flash storage device is based on a Joint Electron Device Engineering Council (JEDEC) Universal Flash Storage standard.

5. The memory device of claim 1, wherein the memory device to couple to a system-on-chip device including the host device.

6. The memory device of claim 1, wherein a physical layer of the protocol logic includes the receiver circuitry and the transmitter circuitry, and wherein the physical layer is based on a MIPI M-PHY specification.

7. A method at a memory device, the method comprising:
   with protocol logic of the memory device, exchanging with a host device coupled to the memory device communications based on a unified protocol specification, including receiving a data frame from the host device;
   detecting an error related to a memory operation of the memory device in connection with the received data frame; and
   selecting an error code corresponding to the detected error of the memory operation, wherein the selected error code is included in a negative acknowledgement control (NAC) message having a NAC frame structure for the host device defined by the unified protocol specification;
   wherein the exchanging communications with the host device further comprises sending the NAC message from the memory device to the host, the NAC message including both the selected error code and a negative acknowledgment identifier in the NAC frame structure.

8. The method of claim 7, wherein the memory device includes a flash storage device.

9. The method of claim 8, wherein the flash storage device is based on a Joint Electron Device Engineering Council (JEDEC) Universal Flash Storage standard.

10. The method of claim 7, wherein a physical layer of the protocol logic includes the receiver circuitry and the transmitter circuitry, and wherein the physical layer is based on a MIPI M-PHY specification.

11. A host device comprising:
    protocol logic including circuitry configured to exchange communications with a memory device coupled to the host device, wherein the host device to control the memory device, the communications based on a unified protocol specification, the protocol logic including:
       physical layer circuitry configured to send a data frame to the memory device;
       frame evaluation logic configured to receive a negative acknowledgment control (NAC) message having a NAC frame structure defined by the unified protocol specification from the memory device via the physical layer circuitry, the NAC message including both a selected error code relating to a memory operation of the memory device in connection with the data frame and a negative acknowledgment identifier in the NAC frame structure in response to the data frame, the frame evaluation logic configured to detect the negative acknowledgement identifier of the NAC message, wherein the selected error code is selected by the memory device; and error detection logic configured to identify the selected error code of the NAC message, the error detection logic further to store error information to a repository.

12. The host device of claim 11, wherein the memory device includes a flash storage device.

13. The host device of claim 12, wherein the flash storage device is based on a Joint Electron Device Engineering Council (JEDEC) Universal Flash Storage standard.

14. The host device of claim 11, wherein the memory device is to couple to a system-on-chip device including the host device.

15. The host device of claim 11, wherein a physical layer of the protocol logic includes the receiver circuitry and the transmitter circuitry, and wherein the physical layer is based on a MIPI M-PHY specification.

16. A method at a host device, the method comprising:
with protocol logic of the host device, exchanging with a memory device coupled to the host device communications based on a unified protocol specification, the exchanging communications including:
sending a data frame from the host device to a memory device coupled to the host device;
receiving a negative acknowledgment control (NAC) message having a NAC frame structure defined by the unified protocol specification from the memory device in response to the data frame, the NAC message including both a selected error code relating to a memory operation of the memory device in connection with the data frame and a negative acknowledgment identifier in the NAC frame structure, wherein the selected error code is selected by the memory device;
identifying the selected error code of the NAC message; and
based on the error code, storing error information to a repository.

17. The method of claim 16, wherein the memory device includes a flash storage device.

18. The method of claim 17, wherein the flash storage device is based on a Joint Electron Device Engineering Council (JEDEC) Universal Flash Storage standard.

19. The method of claim 16, wherein a physical layer of the protocol logic includes the receiver circuitry and the transmitter circuitry, and wherein the physical layer is based on a MIPI M-PHY specification.

20. The memory device of claim 1, wherein the selected error code includes one or more of a receive buffer overflow error type, a frame length error type, a frame sequence number error type, an acknowledgement and flow control frame syntax error type, a negative acknowledgement frame syntax error type, an end-of-frame error type, a frame syntax error type, a bad control symbol type or a physical adapter error type.

21. The host device of claim 11, wherein the selected error code includes one or more of a receive buffer overflow error type, a frame length error type, a frame sequence number error type, an acknowledgement and flow control frame syntax error type, a negative acknowledgement frame syntax error type, an end-of-frame error type, a frame syntax error type, a bad control symbol type or a physical adapter error type.

* * * * *